No. 688,329. Patented Dec. 10, 1901.
W. H. OSBORN.
FROST PROOF STOP AND WASTE VALVE.
(Application filed June 27, 1901.)
(No Model.)
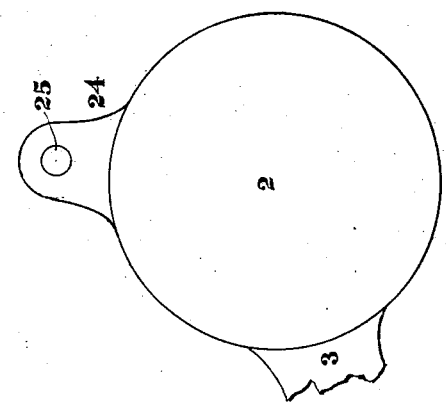
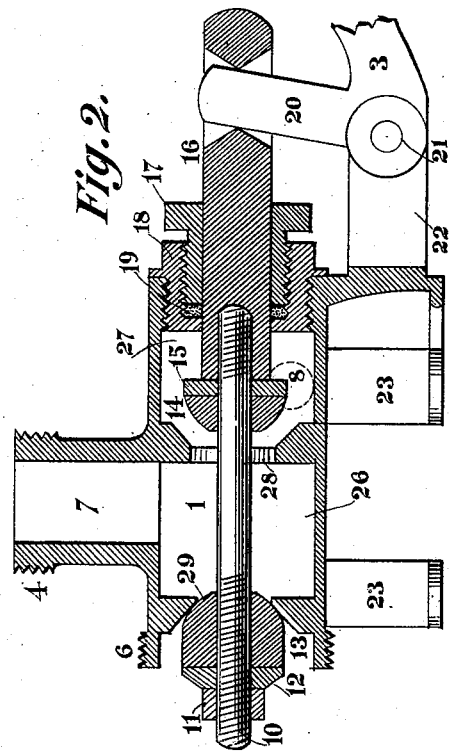
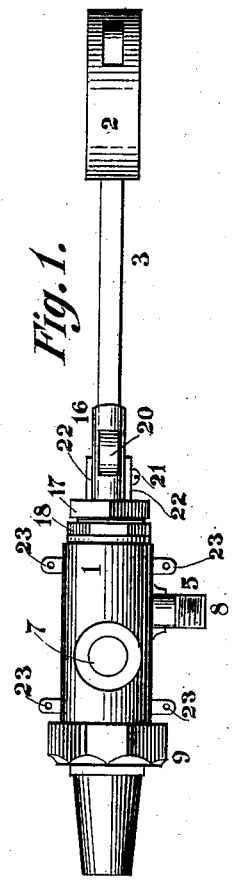
WITNESSES:
W. F. McKinley
Mary M. Ewing.
INVENTOR
William H. Osborn
BY
Abraham Knobel
ATTORNEY

UNITED STATES PATENT OFFICE.

WILLIAM H. OSBORN, OF LOUISVILLE, KENTUCKY.

FROST-PROOF STOP AND WASTE VALVE.

SPECIFICATION forming part of Letters Patent No. 688,329, dated December 10, 1901.

Application filed June 27, 1901. Serial No. 66,315. (No model.)

*To all whom it may concern:*

Be it known that I, WILLIAM H. OSBORN, a citizen of the United States, residing at Louisville, in the county of Jefferson and State of Kentucky, have invented a new and useful Frost-Proof Stop and Waste Valve, of which the following is a specification.

My improvement relates to stop and waste valves which automatically shut off the water and drain the house-pipes in order to prevent freezing; and the objects of my improvement are, first, simplicity; second, durability; third, inexpensiveness of manufacture, and, fourth, to avoid the use of springs in a device of the class named. I attain these objects by means of the mechanism illustrated in the accompanying drawings, in which—

Figure 1 is a plan view, and Fig. 2 a vertical section.

Similar reference characters refer to similar parts throughout the two views.

The hollow casting 1, the weight 2, and the lever 3 constitute the body of the device.

1 is the hollow body portion of the device, which contains the working parts.

2 is the weight at the end of an arm or lever.

3 is an L-shaped arm or lever which carries weight 2 on its outer end and is fulcrumed on a pin at its opposite end in the angle of the L.

4 is the threaded portion of the wall of the projecting opening, which connects with the house-pipe.

5 is the threaded projection for the waste.

6 is the threaded end of body portion 1 where the supply-pipe is attached by a union.

7 is the house-pipe opening in 1.

8 is the waste-opening in 1.

9 is the supply-union.

10 is the operating-rod, upon which the fuller-balls are placed.

11 is the adjusting-nut.

12 is a metal collar which keeps a fuller-ball in place.

13 is the adjusting rubber fuller-ball.

14 is the stationary rubber fuller-ball. 15 is its metal backing-flange.

16 is the piston, bored and threaded to receive 10 and slotted to receive the L portion of 3.

17 is the gland of the stuffing-box.

18 is the stuffing-box.

19 is the packing.

20 is the L extension of 3.

21 is the pin upon which 3 is fulcrumed.

22 represents the two bracket members integral with body 1, which carry pin 21.

23 represents legs or attaching-brackets.

24 is a lug on 2.

25 is a hole through 24.

26 is the supply-chamber.

27 is the waste-chamber.

28 is the waste-port.

29 is the supply-port.

The body portion 1, together with legs 23 and brackets 22, is in one piece and cored out. The threads 4, 5, and 6 are cut on the outside of the openings. The end of body 1 for the piston is tapped out to receive the stuffing-box 18, and the latter is tapped out to receive the gland 17. The piston 16 is drilled and tapped in its inner end, and 10 is screwed longitudinally into it. The piston 16 is operated by the projection 20 of lever 3, and the valve is kept closed by gravity by means of weight 2. The weight 2 is provided with a lug 24, which is pierced with a hole for attaching a chain or cord for operating the valve. The fuller-ball 13 is adjustable by means of the adjusting-nut 11, so that the supply and rapidity of waste may be regulated according to the service-pressure.

My device operates in the following manner: The supply is connected at 6 by means of the union 9. The opening 7 is connected with the house-pipe and the waste-pipe at 5. The waste is led to the sewer. Normally the supply-port 29 is closed and the waste-port 28 open, so that the water in the house-pipe passes through waste-port 28 into waste-chamber 27 and through opening 8 to the sewer. To admit the supply, weight 2 is raised by means of the chain or cord attached at 25, piston 16 is pushed in by 20, fuller-ball 14 closes waste-port, and at the same time supply-port 29 is opened. To cut off the water from the house, it is necessary only to release weight 2, which by its fall automatically and permanently shuts off the supply and opens the waste.

I am aware that devices for the same purpose have been invented with springs and more complicated combinations. I am of course also aware of my application for patent on a somewhat similar device, Serial No. 725,508, dated December 1, 1900. Therefore I do not claim the device broadly; but,

Having thus described my invention, so that any one skilled in the art to which it pertains may make it, what I do claim as my invention, and desire to secure by Letters Patent, is—

1. In a combined stop and waste valve, the combination of a hollow cylindrical body portion, a stuffing-box in one end of said body portion, a piston operating through said stuffing-box, an operating-rod screwed axially into the inner end of said piston, a supply and a waste port in the body portion, and a stationary and an adjustable fuller-ball on the operating-rod, so disposed as to close the ports alternately, substantially as specified.

2. In a combined stop and waste valve, the combination of a body portion formed of a single piece, a stuffing-box screwed into said body portion, a piston passing through said stuffing-box, an operating-rod screwed into the inner end of said piston, a stationary fuller-ball on the end of aforementioned rod adjacent to said piston, an adjustable fuller-ball on the end of the operating-rod opposite the piston, an adjustable nut on the said end of the operating-rod, the said piston, operating-rod, fuller-balls and adjusting-nut all disposed and operating on the horizontal axis of the cylindrical body, and a fulcrumed and weighted lever to operate said parts, substantially as specified.

3. In a combined stop and waste valve, the following combination: a cylindrical body portion 1; in said body portion 1 a service-pipe opening 6, a house-pipe opening 7, a waste-opening 8, a supply-chamber 26, a waste-chamber 27, a supply-port and valve-seat 29, and a waste-port and valve-seat 28; a stuffing-box 18 screwed longitudinally into one end of the body portion; a piston 16 slotted on its projecting end and passing through aforesaid stuffing-box; an operating-rod 10 threaded on both ends, and one end screwed longitudinally into the inner end of piston 16; a stationary fuller-ball 14 and a metal flange 15 disposed on the end of rod 10 adjacent to piston 16, an adjustable fuller-ball 13, flange 12 and adjusting-nut disposed on the end of rod 10 opposite the piston; a lever 3 fulcrumed at 21, an L projection on lever 3 passing upward through the slot in piston 16; and a bracket 22 integral with body 1, all substantially as and for the purpose specified.

WILLIAM H. OSBORN.

Witnesses:
M. F. McKINLEY,
MARY M. EWING.